United States Patent
Huang et al.

(10) Patent No.: US 12,457,577 B2
(45) Date of Patent: Oct. 28, 2025

(54) WIRELESS CONTROL METHOD, DEVICE, BLE APPARATUS, CHIP, AND STORAGE MEDIUM

(71) Applicant: ZHUHAI JIELI TECHNOLOGY CO., LTD, Zhuhai (CN)

(72) Inventors: Ziming Huang, Zhuhai (CN); Changji Wang, Zhuhai (CN); Guangjun Luo, Zhuhai (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 572 days.

(21) Appl. No.: 17/909,047

(22) PCT Filed: Sep. 30, 2020

(86) PCT No.: PCT/CN2020/119599
§ 371 (c)(1),
(2) Date: Sep. 2, 2022

(87) PCT Pub. No.: WO2021/174843
PCT Pub. Date: Sep. 10, 2021

(65) Prior Publication Data
US 2023/0089577 A1    Mar. 23, 2023

(30) Foreign Application Priority Data
Mar. 5, 2020   (CN) .......................... 202010148151.7

(51) Int. Cl.
*H04W 64/00* (2009.01)
*H04W 76/14* (2018.01)

(52) U.S. Cl.
CPC ......... *H04W 64/006* (2013.01); *H04W 76/14* (2018.02)

(58) Field of Classification Search
CPC ... H04W 64/006; H04W 76/14; H04W 4/025; H04W 4/029; H04W 4/80; H04W 84/18;
(Continued)

(56) References Cited

U.S. PATENT DOCUMENTS

| 2013/0122935 A1* | 5/2013 | Das | H04W 4/029 |
| | | | 455/456.6 |
| 2016/0360341 A1* | 12/2016 | Srivatsa | H04W 76/14 |

(Continued)

FOREIGN PATENT DOCUMENTS

| CN | 104936134 A | * | 9/2015 |
| CN | 105703807 A | | 6/2016 |

(Continued)

OTHER PUBLICATIONS

International Search Report for corresponding Application No. PCT/CN2020/119599 dated Jan. 7, 2021, 6 pages.
(Continued)

*Primary Examiner* — Nimesh Patel
(74) *Attorney, Agent, or Firm* — Taft Stettinius & Hollister LLP

(57) ABSTRACT

A wireless control method, a device, a BLE apparatus, a chip, and a storage medium. The BLE apparatus as a control end communicates with at least one other BLE apparatus via a Bluetooth link. The method comprises: S01, receiving a positioning packet sent by the at least one other BLE apparatus at a preset time interval; S02, obtaining, in accordance with the received positioning packet and by using a Bluetooth orientation technique, a first relative movement path of the at least one other BLE apparatus with respect to the BLE apparatus; S03, determining, according to a predetermined mapping relationship, a control function corresponding to the first relative movement path; and S04, sending, in accordance with the control instruction to the at
(Continued)

least one other BLE apparatus to perform the control function.

20 Claims, 5 Drawing Sheets

(58) Field of Classification Search
CPC ....... H04W 4/30; H04W 12/50; H04W 12/06; H04W 4/023; H04W 4/38; H04W 12/08; H04W 8/005; H04W 4/02; H04W 12/64; H04W 4/70; H04W 84/20; H04W 12/63; H04W 4/027; H04W 4/33; H04W 48/04; H04W 52/0219; H04W 88/02; H04W 12/33; H04W 4/024; H04W 52/283; H04W 52/028; H04W 52/0245; H04W 52/0258; H04W 52/0277; H04W 52/282; H04W 76/10; H04W 76/15; H04W 36/18; H04W 4/21; H04W 48/18; H04W 88/10; H04W 64/00; H04W 8/205; G08C 17/02; G08C 2201/32; G08C 2201/30; G08C 19/00; G08C 2201/93; Y02D 10/00; Y02D 30/70; G06N 20/00; H04M 1/72412; H04M 1/72409; H04M 1/724095; H04M 2250/12; H04M 1/6066; H04M 1/72457; H04M 1/72463; H04M 11/022; H04M 2250/02; H04M 2250/04; H04M 2250/06; H04L 12/2816; H04L 51/52; H04L 63/0407; H04L 65/403; H04L 67/125; H04L 67/306; H04L 67/303; H04L 63/0869; H04L 67/51
See application file for complete search history.

(56) References Cited

U.S. PATENT DOCUMENTS

| 2017/0111863 A1* | 4/2017 | Kochery | ............... H04W 8/005 |
| 2017/0187828 A1* | 6/2017 | Soji | ......................... H04L 67/62 |
| 2018/0176776 A1* | 6/2018 | Knaappila | ............... H04W 4/80 |
| 2022/0078864 A1* | 3/2022 | Yang | ..................... H04L 5/0053 |

FOREIGN PATENT DOCUMENTS

| CN | 108228068 | A | | 6/2018 |
| CN | 108811182 | A | * | 11/2018 |
| CN | 109379653 | A1 | | 2/2019 |
| CN | 109561414 | A | | 4/2019 |
| CN | 110582078 | A | | 12/2019 |
| WO | 2017185339 | A1 | | 11/2017 |

OTHER PUBLICATIONS

Written Opinion for corresponding Application No. PCT/CN2020/119599 dated Jan. 7, 2021, 3 pages.
International Search Authority document for corresponding Application No. PCT/CN2020/119599 dated Jan. 7, 2021, 1 page.

* cited by examiner

WIRELESS CONTROL METHOD, DEVICE, BLE APPARATUS, CHIP, AND STORAGE MEDIUM

CROSS REFERENCE TO RELATED APPLICATIONS

This is a U.S. National Stage application of, and claims priority to, PCT/CN2020/119599, filed Sep. 30, 2020, which further claims priority to Chinese Patent Application No. 202010148151.7, filed Mar. 5, 2020, the disclosures of which are incorporated herein by reference in their entirety.

TECHNICAL FIELD

The present disclosure relates to the field of wireless communication, and particularly to a wireless control method and apparatus, a Bluetooth Low Energy (BLE) device, a chip and a storage medium based on BLE direction positioning.

BACKGROUND

With the development of wireless technology, the BLE is becoming more and more widely used. Most of the existing electronic devices have Bluetooth functions, such as smart home devices, mobile terminals, and wearable devices. Therefore, the wireless control method based on the Bluetooth technology is also more and more important. In applications of the existing wireless Bluetooth communication, such as the simplest connection pairing, it usually requires at least one device with a display touch module or a button module to trigger the Bluetooth device to enter an operating mode such as connection, pairing and control, etc., and sometimes pairing input is required, and there are often cases where multiple operations are required to correctly pair, thus the operation is cumbersome. Moreover, even if the user can accept multiple manual operations, since the default device name of the device usually uses the MAC address as the display name, and the same type of devices are usually displayed with the same name, it is difficult to distinguish only from the display. The user has inconvenience in the selection operation of the device, which is easy to cause selection errors and control failures, and require re-operation. For the BLE device as the control terminal, if there are multiple different devices needing to be controlled, it is usually difficult to distinguish the different controlled devices, and false control often occurs.

Therefore, when an existing BLE device performs the wireless control of pairing, connection and other functions, a display module or a button is usually required to trigger, and the operation is cumbersome and the error is larger. Not only the cost of the product is high, which affects the competitiveness of the product, but also the operation is cumbersome, which affects the aesthetics of the product and the user experience.

SUMMARY

In view of the above, the main purpose of the present disclosure is to provide a wireless control method and apparatus, a BLE device, a chip and a storage medium, which can realize accurate control connection between different Bluetooth devices, thereby avoiding repeated operations or complex operations and improving user experience, and meanwhile reducing product cost and improving product aesthetics.

In order to implement the above purpose, the technical solution of the present disclosure is provided as follows.

A wireless control method, applied to a Bluetooth Low Energy (BLE) device as a control terminal, the BLE device communicating with at least one other BLE device through a Bluetooth link, the method including:

S01: receiving positioning packets transmitted by the at least one other BLE device at a preset time interval;

S02: obtaining a first relative movement trajectory of the at least one other BLE device with respect to the BLE device according to the received positioning packets in combination with a Bluetooth direction positioning technology, wherein the first relative movement trajectory is a valid trajectory in a preset trajectory database determined according to a predetermined mapping relationship;

S03: determining a control function corresponding to the first relative movement trajectory according to the predetermined mapping relationship;

S04: transmitting a corresponding control instruction to the at least one other BLE device according to the control function to execute the control function.

Optionally, the positioning packets are broadcast communication packets, and the method further includes:

before the step S01,

S00: controlling the BLE device in an unconnected state to enter a scanning state.

Optionally, the step S04 includes:

S041: determining the corresponding control instruction according to the control function;

S042: transmitting the control instruction in the form of a broadcast communication packet to execute the control function, wherein the control instruction carries an address of the at least one other BLE device.

Optionally, the positioning packets are connection data packets, and the method includes:

before the step S01,

S0: enabling the BLE device in the connected state to transmit a connection data packet according to a Bluetooth standard protocol to the at least one other BLE device establishing a connection to adjust a communication parameter, such that the at least one other BLE device transmits the positioning packets.

Optionally, the step S04 includes:

S043: determining the corresponding control instruction according to the control function;

S044: transmitting the connection data packet carrying the control instruction to the at least one other BLE device to execute the control function.

Optionally, the at least one other BLE device comprises a first BLE device and a second BLE device, and the control function is a pairing connection function, wherein, the step S041 or S043 includes: acquiring first pairing information of the first BLE device and second pairing information of the second BLE device to form a first pairing information instruction carrying the second pairing information and a second pairing connection instruction carrying the first pairing information;

the step S042 or S044 includes: transmitting the first pairing connection instruction to the first BLE device and the second pairing connection instruction to the second BLE device, to perform a pairing connection between the first BLE device and the second BLE device.

Optionally, the BLE device further communicates with a third BLE device through the Bluetooth link, and the method further includes:

after the step S04,

S05: periodically receiving the positioning packets transmitted by the third BLE device to track a second relative movement trajectory of the third BLE device with respect to the BLE device;

S06: determining whether the first relative movement trajectory is the same as the second relative movement trajectory and both correspond to a preset movement trajectory; when the first relative movement trajectory is the same as the second relative movement trajectory and both correspond to a preset movement trajectory, performing a step S07;

S07: transmitting a preset control instruction to the at least one other BLE device such that the at least one other BLE device establishes a control relationship with the third BLE device;

S08: transmitting control information corresponding to the at least one other BLE device to the third BLE device, such that the at least one other BLE device establishes the control relationship with the third BLE device.

Optionally, the Bluetooth direction positioning technology is an Angle of Arrival (AOA) technology, and the step S02 includes:

S021: calculating an angle of arrival of the at least one other BLE device transmitting the positioning packets with respect to the BLE device according to the received positioning packets through the AOA technology;

S022: determining a relative position of the at least one other BLE device with respect to the BLE device according to the angle of arrival;

S023: tracking a plurality of relative positions to determine the first relative movement trajectory of the at least one other BLE device with respect to the BLE device.

Optionally, the Bluetooth direction positioning technology is an Angle of Departure (AOD) technology, and the step S02 includes:

S026: calculating an angle of departure of the at least one other BLE device transmitting the positioning packets relative to the BLE device according to the received positioning packets through the AOD technology;

S027: determining a relative position of the at least one other BLE device with respect to the BLE device according to the angle of departure;

S028: tracking a plurality of relative positions to determine the first relative movement trajectory of the at least one other BLE device with respect to the BLE device.

Optionally, the step S023 or S028 includes:

S0201: for each relative position, determining the relative position as a valid position point according to a distribution of each trajectory point in the trajectory database;

S0202: determining a first valid position point within a preset time as a starting point of the trajectory, and when a plurality of valid position points starting from the starting point of the trajectory fall into the same first trajectory in the preset trajectory database and the first trajectory is completed within the preset time, determining the first trajectory as the first relative movement trajectory;

S0203: when any valid position point and a previous valid position do not fall into the first trajectory or the first trajectory is not completed within the preset time, performing retiming and performing the step S0202.

Optionally, the BLE device is an earphone charging box, and the number of the at least one other BLE device is two, including a first true wireless Bluetooth earphone and a second true wireless Bluetooth earphone; the first true wireless Bluetooth earphone and the second true wireless Bluetooth earphone form a Bluetooth earphone pair.

In order to implement the above purpose, a wireless control apparatus is provided, which is applied to a BLE device, the BLE device as a control terminal communicating with at least one other BLE device through a Bluetooth link, the wireless control apparatus includes:

a data receiving module, configured to receive positioning packets transmitted by at least one other BLE device at a preset time interval;

a direction positioning module, configured to obtain a first relative movement trajectory of the at least one other BLE device with respect to the BLE device according to the received positioning packets in combination with a Bluetooth direction positioning technology, wherein the first relative movement trajectory is a valid trajectory in a preset trajectory database determined according to a predetermined mapping relationship;

a trajectory mapping module, configured to determine a control function corresponding to the first relative movement trajectory according to the predetermined mapping relationship;

an instruction transmitting module, configured to transmit a corresponding control instruction to the at least one other BLE device according to the control function to execute the control function.

Optionally, the positioning packets are broadcast communication packets, and the wireless control apparatus further includes:

a mode control module, configured to control the BLE device in an unconnected state to enter a scanning state.

Optionally, the instruction transmitting module includes:

a first instruction determination unit, configured to determine the corresponding control instruction according to the control function;

an instruction broadcast unit, configured to transmit the control instruction in the form of a broadcast communication packet to execute the control function, wherein the control instruction carries an address of the at least one other BLE device.

Optionally, the positioning packets are connection data packets, and the wireless control apparatus further includes:

a communication adjustment module, configured to enable the BLE device in the connected state to transmit a connection data packet according to a Bluetooth standard protocol to the at least one other BLE device establishing a connection to adjust a communication parameter, such that the at least one other BLE device transmits the positioning packets.

Optionally, the instruction transmitting module includes:

a second instruction determination unit, configured to determine the corresponding control instruction according to the control function;

an instruction transmitting unit, configured to transmit the connection data packet carrying the control instruction to the at least one other BLE device to execute the control function.

Optionally, the number of the at least one other BLE device is two, and the at least one other BLE device comprises a first BLE device and a second BLE device, the control function is a pairing connection function;

the first instruction determination unit or the first instruction determination unit is configured to: acquire first pairing information of the first BLE device and second pairing information of the second BLE device to form a first pairing information instruction carrying the second pairing information and a second pairing connection instruction carrying the first pairing information;

the instruction broadcast unit or the instruction transmitting unit is configured to: transmit the first pairing connection instruction to the first BLE device and the second pairing connection instruction to the second BLE device, to perform a pairing connection between the first BLE device and the second BLE device.

Optionally, the BLE device further communicates with a third BLE device through the Bluetooth link;

the data receiving module is further configured to periodically receive the positioning packets transmitted by the third BLE device;

the direction positioning module is further configured to track a second relative movement trajectory of the third BLE device with respect to the BLE device according to the positioning packets transmitted by the third BLE device;

the trajectory mapping module is further configured to determine whether the first relative movement trajectory is the same as the second relative movement trajectory and both correspond to a preset movement trajectory;

the instruction transmitting module is further configured to:

when the first relative movement trajectory is the same as the second relative movement trajectory and both correspond to the preset movement trajectory, transmit a preset control instruction to the at least one other BLE device such that the at least one other BLE device establishes a control relationship with the third BLE device;

transmit control information corresponding to the at least one other BLE device to the third BLE device, such that the at least one other BLE device establishes the control relationship with the third BLE device.

Optionally, as for the Bluetooth direction positioning technology AOA technology, the direction positioning module includes:

a direction calculation unit, configured to calculate an angle of arrival of the at least one other BLE device transmitting the positioning packets with respect to the BLE device according to the received positioning packets through the AOA technology;

a position calculation unit, configured to determine a relative position of the at least one other BLE device with respect to the BLE device according to the angle of arrival;

a movement tracking unit, configured to track a plurality of relative positions within a preset time to determine the first relative movement trajectory of the at least one other BLE device with respect to the BLE device.

Optionally, as for the Bluetooth direction positioning technology AOD technology, the direction positioning module includes:

a direction calculation unit, configured to calculate an angle of departure of the at least one other BLE device transmitting the positioning packets relative to the BLE device according to the received positioning packets through the AOD technology;

a position calculation unit, configured to determine a relative position of the at least one other BLE device with respect to the BLE device according to the angle of departure;

a movement tracking unit, configured to track a plurality of relative positions within a preset time to determine the first relative movement trajectory of the at least one other BLE device with respect to the BLE device.

Optionally, the movement tracking unit includes:

a position screening subunit configured to, for each relative position, determine the relative position as a valid position point according to a distribution of each trajectory point in the trajectory database;

a trajectory determination subunit configured to:

determine a first valid position point within the preset time as a starting point of the trajectory, and when a plurality of valid position points starting from the starting point of the trajectory fall into the same first trajectory in the preset trajectory database and the first trajectory is completed within the preset time, determine the first trajectory as the first relative movement trajectory;

when any valid position point and a previous valid position do not fall into the first trajectory or the first trajectory is not completed within the preset time, perform retiming to determine whether the valid position points within the present time form the first trajectory.

Optionally, the BLE device is an earphone charging box, and the number of the at least one other BLE device is two, comprising a first true wireless Bluetooth earphone and a second true wireless Bluetooth earphone; the first true wireless Bluetooth earphone and the second true wireless Bluetooth earphone form a Bluetooth earphone pair.

In order to implement the above purpose, a Bluetooth Low Energy (BLE) device is provided, which communicates with other BLE devices through a Bluetooth link, comprising: a processor configured to implement the above-mentioned method.

In order to implement the above purpose, a chip for a Bluetooth Low Energy (BLE) device having an integrated circuit thereon is provided, the integrated circuit is designed to implement the above-mentioned method.

In order to implement the above purpose, a storage medium storing a computer program is provided, when the computer program is executed by a processor, the above-mentioned method is performed.

Advantageous Effects

In the wireless control method and apparatus, the BLE device, the chip and the storage medium of the present disclosure, the relative movement trajectory between the Bluetooth devices is obtained by using the Bluetooth direction positioning technology, and then different control functions are transmitted according to the relative movement trajectory, without needing the device to display information or the user to press a button, perform a touch operation or other input operations, just simple trajectory movement and detection are required, and then the accurate control between BLE devices can be implemented, thereby avoiding tedious and complex operations, improving the user experience, and meanwhile reducing the hardware requirement of the device and the cost requirement of the device.

Other advantages effects of the present disclosure will be illustrated in the specific embodiments through the introduction of specific technical limitations and technical solution. Those skilled in the art can understand the advantageous effects of the technical limitations and technical solution through the introduction of these technical limitations and technical solution.

BRIEF DESCRIPTION OF THE DRAWINGS

Preferred embodiments according to the present disclosure will be described below with reference to the accompanying drawings. In the figures.

DETAILED DESCRIPTION

In order to describe the technical solution of the present disclosure in more detail and to facilitate further understanding of the present disclosure, the specific embodiments of the present disclosure are described below with reference to the accompanying drawings. However, it should be appreciated that all the exemplary embodiments and descriptions thereof are utilized to explain the present disclosure and do not constitute an only limitation to the present disclosure.

The present disclosure can be applied to various BLE devices, which can be mobile terminals such as mobile phones, Bluetooth headsets or Bluetooth speakers, etc., or various smart homes, such as smart air conditioners with BLE modules, smart refrigerators, smart televisions or remote controllers, etc., which are not limited by the present disclosure.

In the present disclosure, the BLE device, as a control terminal, communicates with other BLE devices through a Bluetooth link, and controls other BLE devices. It can be appreciated that, in other embodiments, a BLE device can serve as a control terminal or a controlled terminal in different communications.

It can be appreciated that, in the present disclosure, the number of other BLE devices serving as the controlled terminals is at least one, which will not be repeated thereafter in the present disclosure.

The Bluetooth direction positioning technology is introduced below.

In Bluetooth low energy, the Bluetooth standard protocol introduces two direction positioning technologies, namely angle of arrival (AOA) technology and angle of departure (AOD) technology, to measure a direction angle between Bluetooth and implement the positioning function. The AOA technology and AOD technology are introduced as follows.

The AOA technology is based on a receiver and a transmitter. For example, a multi-antenna device serves as a receiver, another single-antenna device serves as a transmitter; the transmitter transmits a RF signal through the single antenna, and there exists a phase difference between the signals received by the multiple receiving antennas of the receiver; the receiver using the phase difference information to estimate the angle of arrival, accordingly the position of the transmitter can be tracked in combination with the direction of the transmission.

Figure 1:
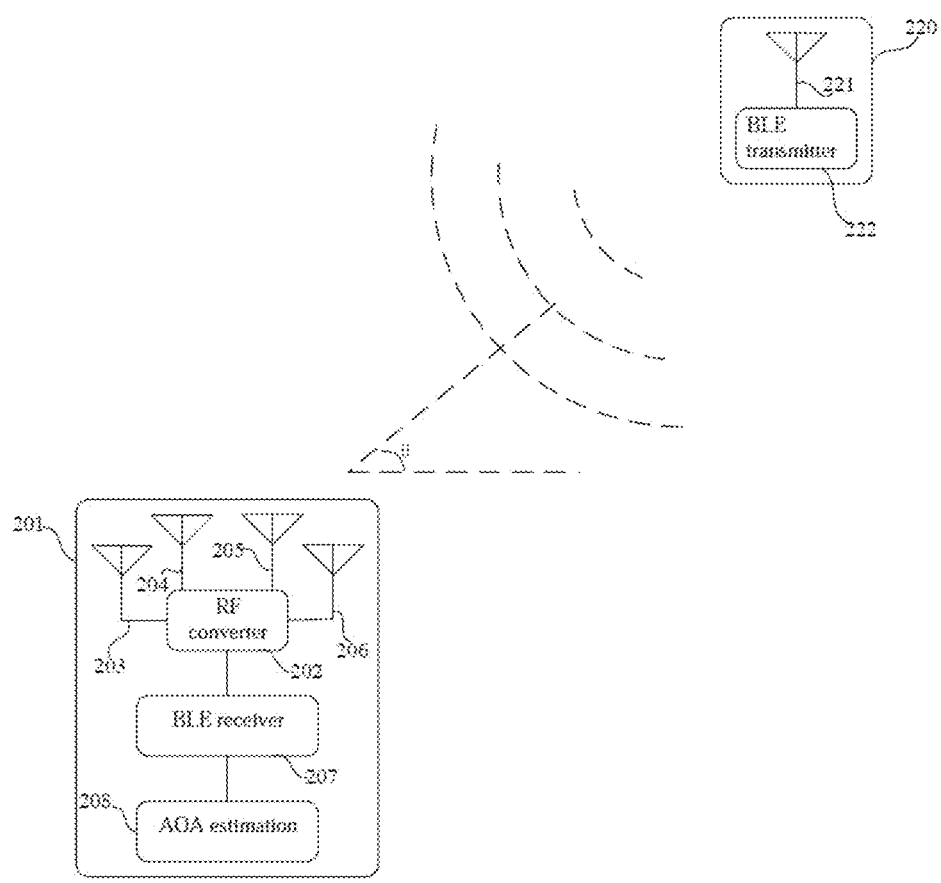
FIG. 1 is an application environment diagram of an existing AOA technology.

Referring to FIG. 1, which shows an application environment diagram of the existing AOA technology. A BLE device 201 is a multi-antenna device, a BLE device 220 is a single-antenna device; the BLE device 201 serves as a receiver configured to receive the radio frequency signal with a direction-finding function transmitted from the BLE device 220 through a single antenna 221. There is a phase difference among the signals received by antennas 203, 204, 205, and 206; and the BLE device 201 can estimate the angle of arrival θ of the radio frequency signal according to the phase difference information. The position of the BLE device 201 can be determined through a plurality of angles of arrival θ.

A calculation process of the angle of arrival θ is illustrated below by taking a dual antenna as an example.

Figure 2:
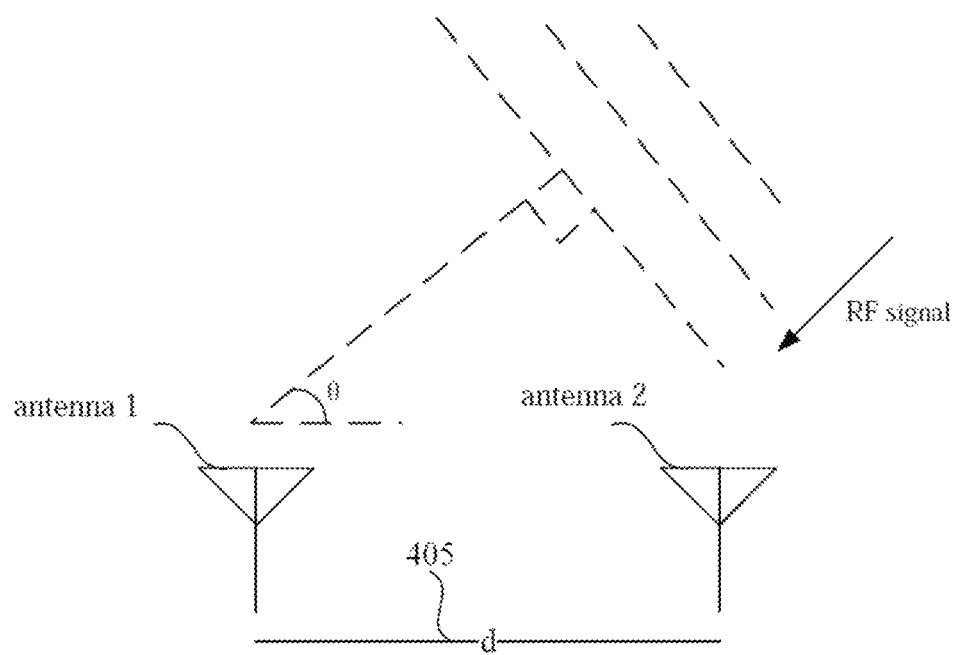
FIG. 2 is a schematic diagram showing a method for calculating an angle of arrival in the prior art.

Referring to FIG. 2, which is a schematic diagram showing a method for calculating an angle of arrival. As shown in the figure, an RF signal transmitted by the transmitter device is incident onto a multi-antenna array of the receiver device at an angle of θ, such as antenna 1 and antenna 2 in the figure, a sampling signal received by the k-th antenna is represented as:

$$x_m = A e^{j(2\pi 71\ nts + \varphi_m + \varphi_0)} + \varepsilon_m[n],\ m = 1\ldots M;$$

as shown in FIG. 2, a wave path difference between a signal reaching the antenna 1 and the signal reaching the antenna 2 is denoted as $$\tau = \frac{d\cos\theta}{c};$$

phase difference is denoted as $$\Delta\varphi = 2\pi f \tau = 2\pi f \frac{d\cos\theta}{c};$$

where c represents a velocity of light; d represents a distance between the antennas; f represents an RF frequency. Accordingly, direction angles of the transmitter device and the receiver device can be estimated, i.e., AOA of the transmitter device is $$\theta = \arccos\left(\frac{c\Delta\varphi}{2\pi f d}\right).$$

Thus, the two antennas can determine an angle of arrival; but through one or more angles of arrival, the receiver device can confirm relative direction and position of the transmitter device with respect to the receiver device, thereby tracking the transmitter device.

The AOD technology is similar to the AOA technology. However, in the AOD technology, a multi-antenna device serves as a transmitter and another single-antenna device serves as a receiver; the transmitter sequentially sends RF signals with phase differences through the multiple antennas; the receiver uses the phase difference between the received signals to estimate the angle of departure of the RF signal. Therefore, through the calculation of a plurality of angles of departure, the position of the transmitter can be tracked in combination with the transmitting direction. The calculation method is basically the same as that of AOA, which will not be repeated here, and the angle of departure is $$\theta = \arccos\left(\frac{c\Delta\varphi}{2\pi f d}\right).$$

In the AOA and AOD technologies, the RF signal sent by the transmitter is a communication packet carrying a Constant Tone Extension (CTE) signal field. The communication packet is generally referred to as a positioning packet; and any BLE device can transmit a CTE request process to request the other device to send a CTE to implement the AOA/AOD positioning.

Figure 3:
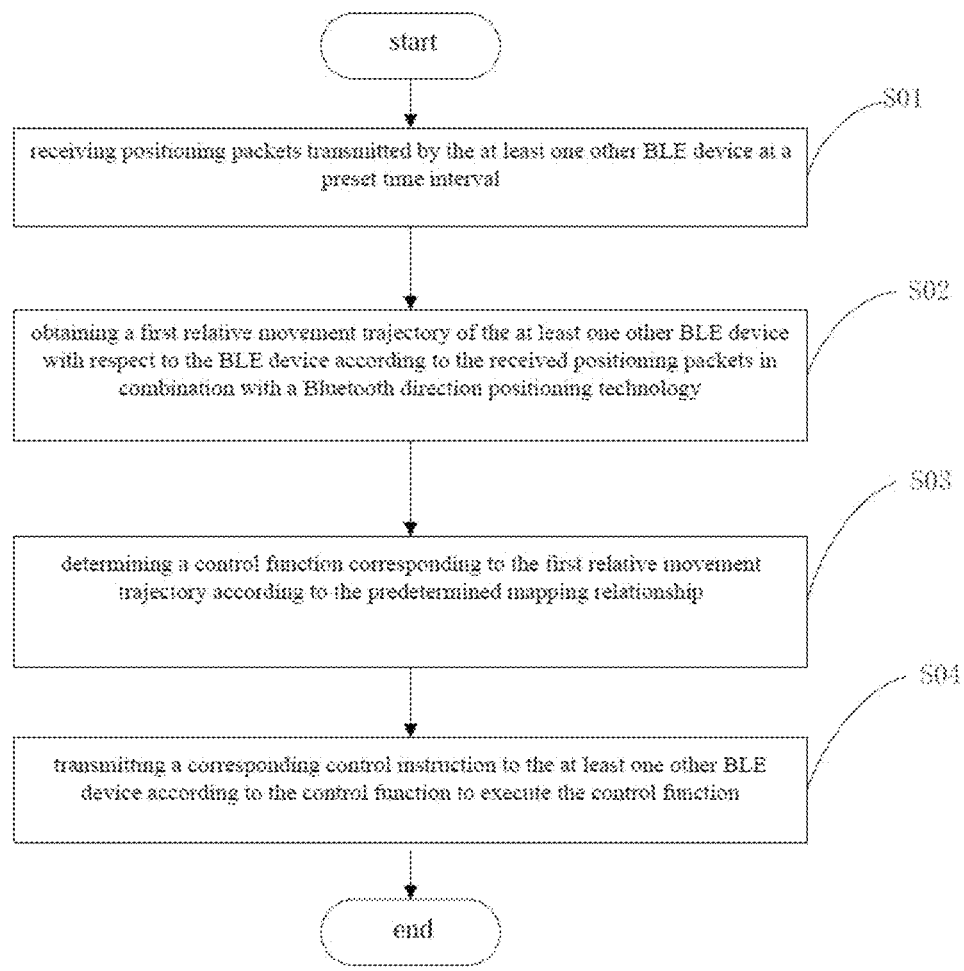
FIG. 3 is a flow chart showing a wireless control method according to an embodiment I of the present disclosure.

Referring to FIG. 3, which is a flow chart showing a wireless control method according to an embodiment I of the present disclosure. In the embodiment, the wireless control method includes the following steps S01-S04.

S01: positioning packets transmitted by at least one other BLE device at a preset time interval are received.

Specifically, it should be appreciated that, before the control function is executed, the BLE device as the control terminal can initiate a CTE request to other BLE devices to request other BLE devices to send the positioning packet carrying the CTE signal. In the Bluetooth standard protocol, the interval time between communication events is generally TIFS. Therefore, the time interval for other BLE devices to send the positioning packets is generally TIFS.

It can be understood that, in the present disclosure, the control terminal and the controlled terminal may be in a connected state or an unconnected state. According to the Bluetooth standard protocol, the BLE device can determine a current state thereof.

S02: according to the received positioning packet, a first relative movement trajectory of at least one other BLE device with respect to the BLE device is obtained in combination with the Bluetooth direction positioning technology.

Specifically, as mentioned above, the BLE device among the BLE devices that receives the positioning packet can position the relative positions of the transmitter and the receiver through the AOA/AOD direction positioning technology.

Figure 4:
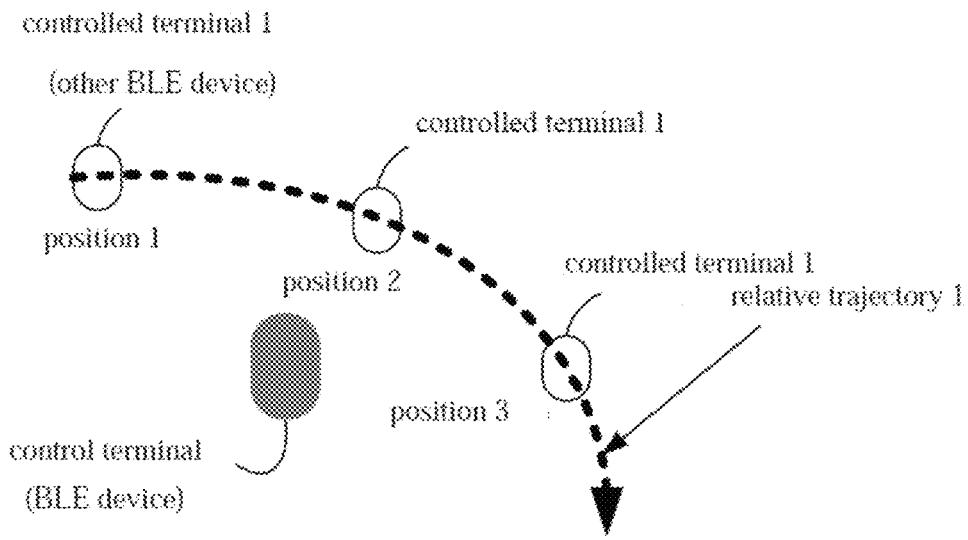
FIG. 4 is a schematic diagram of an implementation scenario in which a control terminal is fixed according to the present disclosure.
Figure 5:
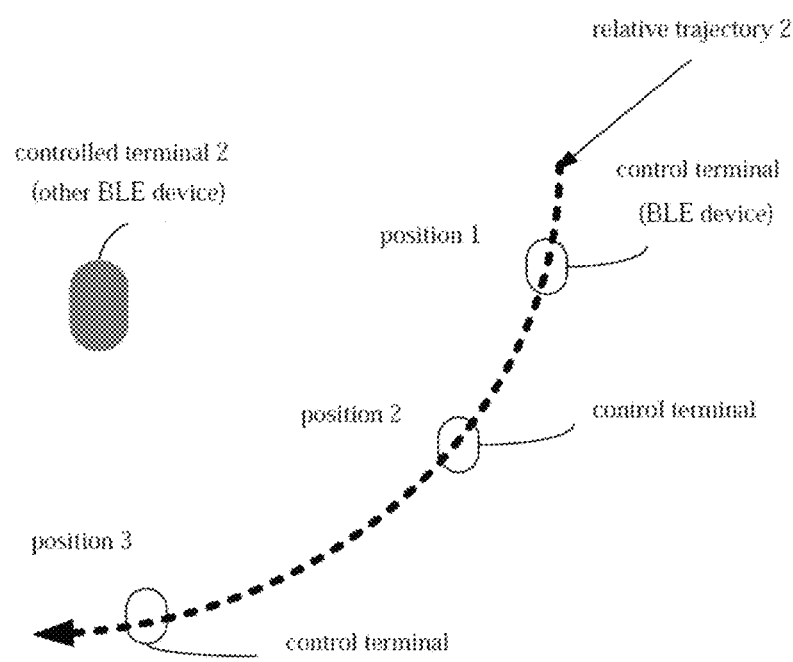
FIG. 5 is a schematic diagram of an implementation scenario in which a control terminal moves according to the present disclosure.

It can be understood that, in different embodiments, the BLE device serving as the control terminal may be a relatively fixed terminal or a mobile terminal. If the control terminal is fixed while other BLE devices transmitting the positioning packets are movable, the control terminal can directly track continuous position changes of other BLE devices to determine the relative movement trajectories. If the control terminal is movable while other BLE devices that send positioning packets are fixed, the control terminal can also determine the relative movement trajectories by determining the position changes of other BLE devices relative to the control terminal. As shown in FIGS. 4-5, there are two different implementation scenarios including that the control terminal is fixed and the control terminal is movable. In FIG. 4, the BLE device as the control terminal is fixed, while other BLE devices as the controlled terminals (such as the controlled terminal 1 in the figure) move from position 1 to position 3 to form a relative movement trajectory 1. In FIG. 5, other BLE devices as the controlled terminals (such as the controlled terminal 2 in the figure) are fixed, while the BLE device as the control terminal moves from position 1 to position 3 to form a relative movement trajectory 2. In the two different implementation scenarios, for the BLE device as the control terminal, the relative trajectories of other BLE devices as the controlled terminals with respect to the BLE device as the control terminal can be obtained through the AOA or AOD direction positioning calculation.

It should be appreciated that when the relative trajectories of other BLE devices as the controlled terminals with respect to the BLE device as the control terminal is tracked, not all movement trajectories are recorded. The BLE device as the control terminal may determine the trajectory, and only track and record a valid trajectory stored in a preset trajectory database, thereby avoiding a false determination and false triggering of an invalid movement. The valid trajectory in the preset trajectory database is a trajectory in a predetermined mapping relationship.

It can be appreciated that, in the present disclosure, the BLE device as the control terminal includes a multi-antenna array and an RF converter module for receiving and switching multiple antennas. The antenna array can be a uniform linear array (ULA), a uniform rectangular array (URA) or a uniform circular array (UCA), which can be set and selected according to requirements of positioning accuracy in practical applications.

It can be appreciated, in the present disclosure, the BLE device as the controlled terminal is preferably a single-antenna device or a multi-antenna device. When the BLE device as the controlled terminal is a multi-antenna device, other antennas can be turned off as required, and only one antenna is left for signal transmission.

S03: a control function corresponding to the first relative movement trajectory is determined according to the predetermined mapping relationship.

Specifically, in the BLE device serving as the control terminal, a predetermined mapping relationship is preset, and the predetermined mapping records a corresponding relationship between a different control function and a preset relative movement trajectory. Therefore, the control function corresponding to the first relative movement trajectory can be determined according to the mapping relationship.

S04: a corresponding control instruction is transmitted to at least one other BLE device according to the control function, to execute the control function.

Specifically, other BLE devices as the controlled terminals may perform the corresponding control function after receiving the control instruction, for example, pairing/unpairing with the control terminal device, or pairing connection/unpairing connection with another controlled terminal, or other control functions, which is not specifically limited by the present disclosure.

Now an earphone charging box is taken as the BLE device serving as the control terminal, and a pair of BLE Bluetooth earphones is taken as other BLE devices as an example to illustrate.

Figure 6:
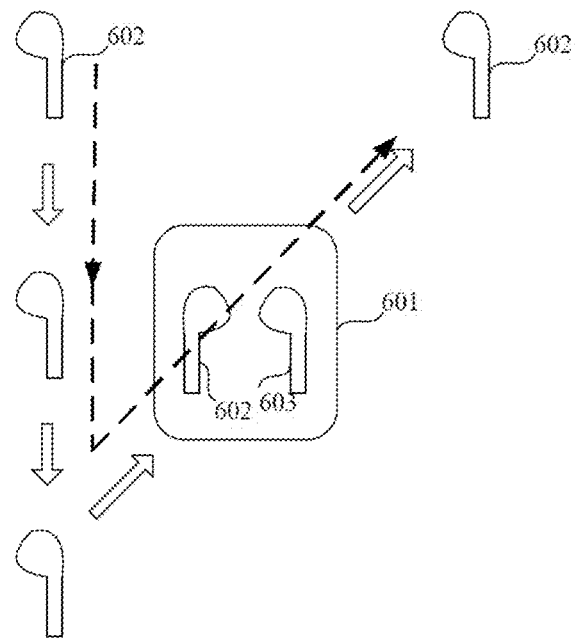
FIG. 6 is a schematic diagram of an implementation scenario in which A wireless control is implemented based on an earphone box and a pair of earphones according to a specific embodiment of the present disclosure.

Referring to FIG. 6 which is a schematic diagram illustrating an earphone box and a pair of earphones. The earphone 602 is taken out of the earphone box or the pair of earphones (which may also be newly bought earphones), a relative movement trajectory (shown by dotted lines in FIG. 6) corresponding to a preset pairing function between devices is described; the earphone box serves as the control terminal, the pairing information such as the mac address, encryption and decryption keys of the earphone 602 is recorded according to the control function pattern depicted by the earphone 602; a pairing connection instruction is transmitted to the earphone 602 and the earphone 601 which is not taken out of the earphone box, to pair and connect the earphone 601 with the earphone 602. Alternatively, the other earphone 601 is taken out to describe the same relative movement trajectory; the earphone box exchanges the pairing information between the dual earphones through the control function corresponding to the same and unique relative movement trajectory depicted by the two earphones, and controls the pairing connection between the dual earphones through the control instruction, to accurately implement the pairing connection between the corresponding dual earphones.

At the same time, the pairing connection and unpairing functions between the dual earphones and an audio source device (such as a mobile phone) can also be implemented by the wireless control method of the present disclosure. For example, the pairing and unpairing functions used in the existing dual-earphone solution usually involve putting the earphones in and taking the earphones out of the earphone box (sometimes it is required to press a button on the earphone box) to implement the processes of unpairing and pairing again. If there simultaneously exists multiple unpaired earphones or the mobile phone has been paired with multiple earphones, the mobile phone cannot determine which one is the earphone of a corresponding user that needs to be paired or unpaired. Therefore, such process does not accurately control the pairing function between the mobile phone and the corresponding earphone; and the user often needs to select according to a name of the earphone. Through the wireless control method of the present disclosure, the earphone can depict the relative movement trajectory corresponding to the pairing or unpairing function, and only the earphone that depicts the relative movement trajectory corresponding to the function can perform a corresponding operation with the mobile phone, thereby reducing more indetermination of pairing/unpairing to achieve the requirement of the accurate control.

Similarly, through the present disclosure, a function of unlocking the terminal can also be implemented, such as unlocking the mobile phone, and the BLE earphone box serves as the control terminal to record the relative movement trajectory corresponding to the function of unlocking the mobile phone depicted by the BLE earphone, so that the unlocking of the mobile phone that has been paired with and connected to the BLE earphone can be implemented. Alternatively, the mobile phone can directly serve as the control terminal to record the relative movement trajectory of the BLE earphone; and when the relative movement trajectory corresponds to the unlocking function, the mobile phone is automatically unlocked.

It should be appreciated that the implementation of the above control functions is not limited to the BLE earphone box matched with the dual earphones, but can also be applied to a mobile terminal such as a mobile phone and other smart devices as the control terminal to record the relative movement trajectory, to trigger the corresponding function.

In the wireless control method provided by the embodiment of the present disclosure, the relative movement trajectory between the Bluetooth devices is obtained by using the Bluetooth direction positioning technology, and then different control functions are triggered according to the relative movement trajectories, without needing the device to display information or the user to press a button, perform a touch operation or other input operations, just simple trajectory movement and detection are required, and then the accurate control between BLE devices can be implemented, thereby avoiding tedious and complex operations, improving the user experience, and meanwhile reducing the hardware requirement of the device and the cost requirement of the device.

In the present disclosure, according to different relative movement trajectories and application environments, the BLE device can implement various control functions. For example, pairing between two mobile devices (TWS earphones) can be implemented, so that the two Bluetooth devices can complete the requirement for accurately controlling the connection between the corresponding devices through the same relative movement trajectory, and exchange the pairing connection information such as MAC address, thereby avoiding repeated operations.

It can be appreciated that preset relative movement trajectories corresponding to different control functions can be predetermined according to different requirements. When a corresponding function need to be implemented, the corresponding relative movement trajectory is completed between different BLE devices.

Further, in an embodiment of the present disclosure, the BLE device as the control terminal can also communicate with a third BLE device through a Bluetooth link, and the third BLE device is a BLE terminal serving as a controlled terminal other than the above-mentioned other BLE devices; and after the step S04, the method further includes the following steps.

S05: positioning packets transmitted by the third BLE device are periodically received to track a second relative movement trajectory of the third BLE device with respect to the BLE device.

S06: it is determined that whether the first relative movement trajectory is the same as the second relative movement trajectory and both correspond to a preset movement trajectory, if yes, step S07 is performed.

S07: a preset control instruction is transmitted to at least one other BLE device such that the at least one other BLE device establishes a control relationship with the third BLE device.

S08: corresponding control information of the at least one other BLE device is transmitted to the third BLE device, such that the at least one other BLE device establishes the control relationship with the third BLE device.

Specifically, in some scenarios, it is sometimes necessary to replace or add a control device. At this time, a new control device usually needs to be paired and connected with other BLE devices as the controlled terminals existing in the scenario one by one to establish the control relationships, which is equivalent to that as for the pairing connections and control relationships established by the original control device, the user needs to repeat the operation with the new control device. However, in the wireless control method of the present disclosure, if the newly added or replaced third BLE device needs to control other BLE devices in the scenario, the third BLE device only needs to mark the same relative movement trajectory with respect to the BLE device serving as the control terminal as other BLE devices establishing control relationships with the BLE device serving as the control terminal, the BLE device as the control terminal transfers the established control relationship to the third BLE device, and meanwhile transmits a control instruction to other BLE devices establishing the control relationships, so that other BLE devices establish control relationships with the third BLE device according to the control instruction. For example, assume that device A is a BLE device as a control terminal and is connected to other BLE devices B and C as controlled terminals, i.e., a control relationship between a control function and a relative movement trajectory with each other is established, such as a predetermined mapping relationship L and pairing information or addresses of devices B and C. Another control terminal device D only needs to mark a relative movement trajectory with respect to the device B or C which is the same as a preset relative movement trajectory of the device A with respect to the device B and C, then the device A may transmit a corresponding instruction carrying the control relationship among the device A, device B and device C to the device D, so that the device D can transmit control instructions to the devices B and C according to the control relationship; and meanwhile the device A also transmits corresponding control instructions carrying an address and control information of D to devices B and C, so that the devices B and C can determine that the device D triggers the same relative movement trajectory, and receive the control instruction transmitted by the device D.

In the embodiment, the control relationship can be transferred through a simple trajectory operation. When there is a control device, a new control device only needs to perform a simple trajectory movement to establish control relationships with other BLE devices, so that the wireless control of other BLE devices can be implemented, thereby avoiding the need for complex repetitive operations, simplifying user operations, and improving the user experience.

Further, in different embodiments, before the control method is performed, the BLE device as the control terminal and other BLE devices as the controlled end may be in a connected state or in an unconnected state. Therefore, a transmitting mode of positioning packets and control instructions can be a broadcast mode or direct directional transmitting mode.

If the BLE device as the control terminal is not connected to other BLE devices as the controlled terminals before the control method is performed, other BLE devices may broadcast the positioning packets by broadcasting. In an embodiment, before the step S01, the wireless control method further includes the following steps.

S00: the BLE device in an unconnected state enters a scanning state.

As mentioned above, in the unconnected state, other BLE devices enter the broadcast state, and broadcasts at preset time intervals and continuously transmits positioning packets with CTE signals; meanwhile the BLE device as the control terminal enters the scanning state and scan the positioning packets broadcasted by other BLE devices.

Accordingly, in the embodiment, the step S04 includes the following steps.

S041: a corresponding control instruction is determined according to the control function.

S042: the control instruction is transmitted in the form of a broadcast communication packet to execute the control function, in which the control instruction carries an address of at least one other BLE device.

As mentioned above, in the unconnected state, the BLE device as the control terminal communicates with other BLE devices as the controlled terminals through broadcast packets; and during a trajectory calculation, each positioning packet broadcasted by other BLE devices as the controlled terminals includes address information of the controlled terminal itself. Therefore, after the relative movement trajectory is determined, the BLE device as the control terminal also knows the address information of the controlled BLE device. After it is determined that what kind of control instruction need to be transmitted, the control instruction is broadcasted, in which the address of the BLE device as the controlled terminal can be added into the broadcast communication packet, so that when detecting the broadcast packet, the BLE device as the controlled terminal can know whether to receive or give up the broadcast packet. For example, assuming that there is a plurality of BLE devices as the controlled terminals, of which only a device A broadcasts the positioning packet and generates a relative movement trajectory with respect to the BLE device as the control terminal, then the control terminal transmits a control instruction corresponding to the relative movement trajectory; although the control instruction is transmitted in the form of a broadcast packet, the broadcast packet carries the address of device A; although the BLE devices as the controlled terminals can detect the broadcast packet, only the device A receives the broadcast packet and execute the control instruction carried in the broadcast packet.

Further, if the BLE device as the control terminal is connected to other BLE devices as the controlled terminals before the control method is performed, the communication can be performed directly through the established connection. In an embodiment, before the step S01, the wireless control method also includes the following steps.

S0: the BLE device in the connected state transmits a connection data packet according to the Bluetooth standard protocol to at least one other BLE device establishing a connection to adjust a communication parameter, such that the at least one other BLE device transmits the positioning packet.

As mentioned above, in the connected state, the BLE device as the control terminal communicates with other BLE devices establishing connections through the established connections, and the communication packet between the two BLE devices are transmitted in the form of a connection communication packet. The connection communication packet includes a synchronous word field, which can be received by only two devices which are connected to each other. The BLE device as the control terminal transmits the connection data packet according to the Bluetooth standard protocol to other BLE devices establishing connections to adjust the communication parameter. The communication parameter may include a communication event interval, a directional packet transmitting request, etc.; other BLE devices that receive the connection data packet may transmit positioning packets to the BLE device as the control terminal in the form of connection communication packet according to the adjusted communication parameter.

Accordingly, in the embodiment, the step S04 includes the following steps.

S043: the corresponding control instruction is determined according to the control function.

S044: the connection data packet carrying the control instruction is transmitted to at least one other BLE device to execute the control function.

As mentioned above, in the connected state, the connection is established between the BLE device as the control terminal and other BLE devices as the controlled terminals in advance. Therefore, after it is determined what kind of control instruction needs to be transmitted, the control instruction can be directly transmitted to other corresponding BLE devices according to the Bluetooth protocol standard, and the control instruction can be carried in a normal connection data packet and is transmitted after the TIFS time of the previous communication event.

Therefore, by using the wireless control method of the present disclosure, it is not required that the control device is definitely connected to the controlled device, but different working states can be applied.

Further, in an embodiment, the number of other BLE devices is two, including a first BLE device and a second BLE device; and the control function is a pairing connection function. In the embodiment, The step S041 or S043 includes: first pairing information of the first BLE device and second pairing information of the second BLE device are acquired to form a first pairing connection instruction carrying the second pairing information and a second pairing connection instruction carrying the first pairing information.

The step S042 or S044 includes: the first pairing connection instruction is transmitted to the first BLE device and the second pairing connection instruction is transmitted to the second BLE device, to perform the pairing connection between the first BLE device and the second BLE device.

Specifically, the first pairing connection instruction carries the second pairing information, and the second pairing connection instruction carries the first pairing information. The control function corresponding to the preset relative movement trajectory can be set as the pairing connection function, for example, the trajectory 1 corresponds to the pairing connection function. When the relative movement trajectories of the first BLE device and the second BLE device with respect to the BLE device as the control terminal are all the trajectory 1, the BLE device as the control terminal acquires the first pairing information of the first BLE device and the second pairing information of the second BLE device through corresponding control instructions. The pairing information may include information such as an MAC address, encryption and decryption keys specified in the Bluetooth standard protocol. Meanwhile the BLE device as the control terminal transmits the first pairing connection instruction to the first BLE device and the second pairing connection instruction to the second BLE device respectively; after receiving the pairing connection instructions respectively, the first BLE device and second BLE device initiate pairing connections to each other to complete the pairing connection therebetween.

During the whole pairing connection process, the user does not need to perform key operations or other input operations on the first BLE device or the second BLE device, but only needs to enable the first BLE device and the second BLE device to complete the same preset relative movement trajectory with respect to the BLE device as the control terminal, and then the pairing connection control between the two devices can be accurately implemented.

Further, in different embodiments of the present disclosure, according to the number of antennas in the BLE device, the AOD or AOA technology can be adopted respectively. Illustration is provided below for different situations.

In an embodiment, the BLE device as the control terminal, serving as a receiver device, can be a single-antenna device (there are only a single-antenna device or a multi-antenna device, but only a single-antenna device operates); at this time, other BLE devices as the controlled terminals serving as positioning packet transmitter devices are multi-antenna devices. In the embodiment, the AOA technology can be adopted to implement the calculation of the trajectory, and the step S02 includes the following steps.

S021: the angle of arrival of the at least one other BLE device transmitting the positioning packets with respect to the BLE device is calculated according to the received positioning packets through the AOA technology.

S022: a relative position of the at least one other BLE device with respect to the BLE device is determined according to the angle of arrival.

S023: a plurality of relative positions is tracked within a preset time to determine the first relative movement trajectory of the at least one other BLE device with respect to the BLE device.

Specifically, the positioning of other BLE devices with respect to the BLE device as the control terminal can be implemented by calculating a plurality of multiple AOA multiple times, as mentioned above, two AOAs determined in a continuous period of time or a duration with a sufficiently small-time interval can be configured to determine a relative position of one transmitter device with respect to the receiver device at a given moment. The relative movement trajectory of the receiver device with respect to transmitter device can be determined through multiple relative positions at different moments within a preset time.

In another embodiment, the BLE device as the control terminal serves as the receiver device and can be a multi-antenna working device; meanwhile, other BLE devices as the controlled terminals serve as the positioning packet transmitter devices and are single-antenna working devices. In the embodiment, the AOD technology can be adopted to implement the calculation of the trajectory, and the step S02 includes following steps.

S026: the angle of departure of the at least one other BLE device transmitting the positioning packets relative to the BLE device is calculated according to the received positioning packets through the AOD technology.

S027: the relative position of the at least one other BLE device with respect to the BLE device is determined according to the angle of departure.

S028: a plurality of relative positions is tracked within a preset time to determine the first relative movement trajectory of the at least one other BLE device with respect to the BLE device.

Specifically, the BLE device as the control terminal can position other BLE devices by calculating multiple AODs multiple times. As mentioned above, two AODs determined in a continuous period of time or a duration with a sufficiently small-time interval can be configured to determine the relative position of one transmitter device with respect to the receiver device at a given moment. The relative movement trajectory between the receiver device and the transmitter device can be determined through multiple relative positions at different moments within a preset time.

It should be appreciated that, in other embodiments, the relative position between the transmitter device and the receiver device can also be determined by the AOD/AOA technology in combination with a signal intensity of the received signal; after the direction is determined through the AOD/AOA, a distance in the direction is determined through the signal intensity, accordingly the positional relationship can also be determined. The calculation of the distance by using the signal intensity is very common in the field of wireless positioning, which is not be detailed here.

Therefore, the wireless control method of the present disclosure can be applied to different BLE devices, the positioning calculation and control are all performed by the control device; there is no fixed requirement for the antennas of the controlled devices; the method can also be applied to the single-antenna device without requiring the controlled device to have a computing power and without reconstructing the existing device.

Further, in an embodiment, the step S023 or S028 includes following steps.

S0201: for each relative position, the relative position is determined as a valid position point according to a distribution of each trajectory point in a trajectory database.

S0202: a first valid position point within a preset time is determined as a starting point of the trajectory; when a plurality of valid position points starting from the starting point of the trajectory fall into the same first trajectory in the preset trajectory database and the first trajectory is completed within the preset time, the first trajectory is determined as the first relative movement trajectory.

S0203: when any first valid position point and a previous valid position cannot fall into the first trajectory or the first trajectory is not completed within the preset time, retiming is performed, and the step S0202 is executed.

In the embodiment, according to the distribution of the trajectory points of all valid trajectories in the preset trajectory database, a plurality of directional areas can be partitioned with the BLE device serving as the control terminal as the center; and each area has a maximum acceptance angle orientation centered on the directional line. When the AOA/AOD positioning is performed on other BLE devices to obtain the relative positions, if the AOA/AOD of a relative position is fall within a maximum acceptance angle of a certain area, it is considered that a position point determined by the AOA/AOD is a valid point, otherwise, it is an invalid point, and the position point is not recorded. In the preset time, the first valid position point is taken as the starting point of the trajectory; if the subsequent valid position points all fall into a certain trajectory in the preset trajectory database such as the first trajectory, and the first trajectory is completed at the valid position points determined within the preset time, the first trajectory is determined as the first relative movement trajectory. If there is a certain valid position point within the preset time such as the first valid position point and the previous valid position point cannot fall into the same trajectory, then the retiming is required; and the first valid position point is taken as the starting point of the trajectory after the retiming, and trajectory is tracked again; or, the valid position points within the preset time cannot completely form the first trajectory, and the retiming is also needed and the trajectory is tracked again.

By determining the validity of the position points and the validity of the trajectory, the calculation accuracy of the trajectory can be improved, and meanwhile the false touch and false control can be avoided.

Figure 7:
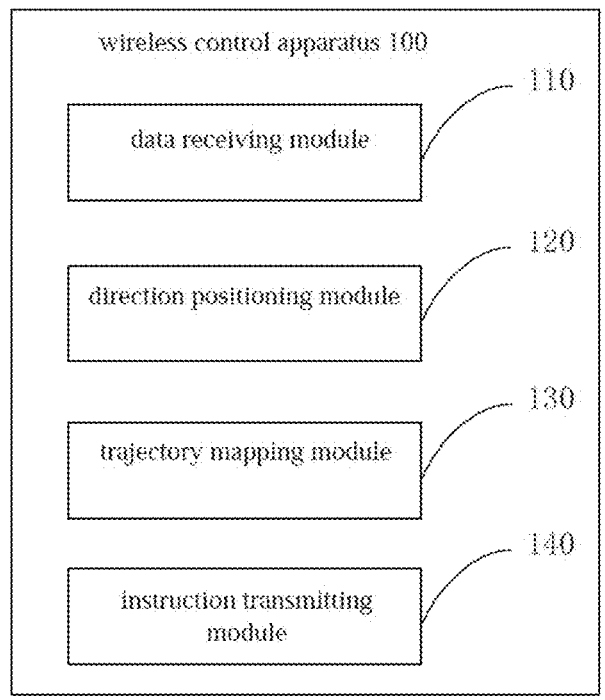
FIG. 7 is a schematic diagram of functional modules of a wireless control apparatus according to a preferred embodiment.

In an embodiment II of the present disclosure, a wireless control apparatus is provided. Referring to FIG. 7, in the embodiment, the wireless control apparatus 100 is applied to a BLE device, and the BLE device as a control terminal communicates with at least one other BLE device through a Bluetooth link; the apparatus includes a data receiving module 110, a direction positioning module 120, a trajectory mapping module 130 and an instruction transmitting module 140.

The data receiving module 110 is configured to receive positioning packets transmitted by at least one other BLE device at a preset time interval.

The direction positioning module 120 is configured to obtain a first relative movement trajectory of the at least one other BLE device with respect to the BLE device according to the received positioning packets in combination with the Bluetooth direction positioning technology.

a trajectory mapping module 130 is configured to determine a control function corresponding to the first relative movement trajectory according to a predetermined mapping relationship.

The instruction transmitting module 140 is configured to transmit a corresponding control instruction to the at least one other BLE device according to the control function to execute the control function.

Further, in an embodiment, the positioning packet is a broadcast communication packet, and the wireless control apparatus further includes:
 a mode control module, configured to control the BLE device in an unconnected state to enter a scanning state.

Further, in an embodiment, the instruction transmitting module 140 includes:
 a first instruction determination unit, configured to determine a corresponding control instruction according to the control function;
 an instruction broadcast unit, configured to transmit the control instruction in the form of a broadcast communication packet to execute the control function, in which the control instruction carries an address of the at least one other BLE device.

Further, in an embodiment, the positioning packets are connection data packets, and the wireless control apparatus further includes:
 a communication adjustment module, configured to enable the BLE device in the connected state to transmit a connection data packet according to the Bluetooth standard protocol to the at least one other BLE device establishing a connection to adjust a communication parameter, such that the at least one other BLE device transmits the positioning packets.

Further, in an embodiment, the instruction transmitting module includes:
 a second instruction determination unit, configured to determine a corresponding control instruction according to the control function;
 an instruction transmitting unit, configured to transmit a connection data packet carrying the control instruction to the at least one other BLE device to execute the control function.

Further, in an embodiment, the at least one other BLE device includes a first BLE device and a second BLE device, and the control function is a pairing connection function.

The first instruction determination unit or the second instruction determination unit is configured to: acquire the first pairing information of the first BLE device and the second pairing information of the second BLE device to form a first pairing information instruction carrying the second pairing information and a second pairing connection instruction carrying the first pairing information.

The instruction broadcast unit or the instruction transmitting unit is configured to: transmit the first pairing connection instruction to the first BLE device and the second pairing connection instruction to the second BLE device, to perform a pairing connection between the first BLE device and the second BLE device.

Further, in an embodiment, the BLE device as the control terminal further communicates with a third BLE device through a Bluetooth link.

The data receiving module is further configured to periodically receive the positioning packets transmitted by the third BLE device.

The direction positioning module is further configured to track a second relative movement trajectory of the third BLE device with respect to the BLE device according to the positioning packets transmitted by the third BLE device.

The trajectory mapping module is further configured to determine whether the first relative movement trajectory is the same as the second relative movement trajectory and both correspond to a preset movement trajectory.

The instruction transmitting module is also configured to:
when the first relative movement trajectory is the same as the second relative movement trajectory and both correspond to a preset movement trajectory, transmit a preset control instruction to the at least one other BLE device such that the at least one other BLE device establishes a control relationship with the third BLE device;
transmit corresponding control information of the at least one other BLE device to the third BLE device, such that the at least one other BLE device establishes the control relationship with the third BLE device.

Further, in an embodiment, as for the Bluetooth direction positioning technology AOA technology, the direction positioning module includes:
a direction calculation unit, configured to calculate an angle of arrival of the at least one other BLE device transmitting the positioning packets with respect to the BLE device according to the received positioning packets through the AOA technology;
a position calculation unit, configured to determine a relative position of the at least one other BLE device with respect to the BLE device according to the angle of arrival;
a movement tracking unit, configured to track a plurality of relative positions within a preset time to determine the first relative movement trajectory of the at least one other BLE device with respect to the BLE device.

Further, in an embodiment, as for the Bluetooth direction positioning technology AOD technology, the direction positioning module includes:
a direction calculation unit, configured to calculate an angle of departure of the at least one other BLE device transmitting the positioning packets relative to the BLE device according to the received positioning packets through the AOD technology;
a position calculation unit, configured to determine a relative position of the at least one other BLE device with respect to the BLE device according to the angle of departure;
a movement tracking unit, configured to track a plurality of relative positions within a preset time to determine the first relative movement trajectory of the at least one other BLE device with respect to the BLE device.

Further, in an embodiment, the movement tracking unit includes:
a position screening subunit configured to, for each relative position, determine the relative position as a valid position point according to a distribution of each trajectory point in a trajectory database;
a trajectory determination subunit configured to:
determine a first valid position point within a preset time as a starting point of the trajectory, and when a plurality of valid position points starting from the starting point of the trajectory fall into the same first trajectory in the preset trajectory database and the first trajectory is completed within the preset time, determine the first trajectory as the first relative movement trajectory;
when any valid position point and a previous valid position cannot fall into the first trajectory or the first trajectory is not completed within the preset time, perform retiming to determine whether the valid position points within the preset time form the first trajectory.

Further, in an embodiment, the BLE device is an earphone charging box, and the number of the at least one other BLE device is two, including a first true wireless Bluetooth earphone and a second true wireless Bluetooth earphone; the first true wireless Bluetooth earphone and the second true wireless Bluetooth earphone form a Bluetooth earphone pair.

The process that the wireless control apparatus implements the wireless control by the above-mentioned wireless control method has already been described in the embodiments of the wireless control method, which is not repeated here.

In an embodiment III of the present disclosure, a BLE device is provided; the BLE device communicates with other BLE devices through a Bluetooth link, and the BLE device includes a processor for implementing the above-mentioned wireless control method.

In an embodiment IV of the present disclosure, a chip for a BLE device having an integrated circuit thereon is provided; the integrated circuit is designed to implement the above-mentioned wireless control method.

In an embodiment V of the present disclosure, a storage medium is provided, on which a computer program is provided, and when the computer program is executed by the processor, the above-mentioned wireless control method is performed.

Those skilled in the art can understand that, under the premise of no conflict, the above preferred embodiments can be freely combined and superimposed.

It should be understood that the above-mentioned embodiments are merely exemplary rather than restrictive, and those skilled in the art can make various obvious or equivalent modifications or substitutions to the above-mentioned details without departing from the basic principles of the present disclosure, which all fall within the scope of the claims of the present disclosure.

What is claimed is:

1. A wireless control method, applied to a Bluetooth Low Energy (BLE) device as a control terminal, the BLE device communicating with at least one other BLE device through a Bluetooth link, the method comprising:
s01: receiving positioning packets transmitted by the at least one other BLE device at a preset time interval;
s02: obtaining a first relative movement trajectory of the at least one other BLE device with respect to the BLE device according to the received positioning packets in combination with a Bluetooth direction positioning technology, wherein the first relative movement trajectory is a valid trajectory in a preset trajectory database determined according to a predetermined mapping relationship;
s03: determining a control function corresponding to the first relative movement trajectory according to the predetermined mapping relationship;
s04: transmitting a corresponding control instruction to the at least one other BLE device according to the control function to execute the control function;
wherein the BLE device further communicates with a third BLE device through the Bluetooth link, and the method further comprises:
after the step s04,
s05: periodically receiving the positioning packets transmitted by the third BLE device to track a second relative movement trajectory of the third BLE device with respect to the BLE device;
s06: determining whether the first relative movement trajectory is the same as the second relative movement trajectory and both correspond to a preset movement trajectory; when the first relative movement trajectory is the same as the second relative movement trajectory and both correspond to a preset movement trajectory, performing a step s07;

s07: transmitting a preset control instruction to the at least one other BLE device such that the at least one other BLE device establishes a control relationship with the third BLE device;

s08: transmitting control information corresponding to the at least one other BLE device to the third BLE device, such that the at least one other BLE device establishes the control relationship with the third BLE device.

2. The wireless control method according to claim 1, wherein the positioning packets are broadcast communication packets, and the method further comprises:

before the step s01, s00: controlling the BLE device in an unconnected state to enter a scanning state;

wherein the step s04 comprises:

s041: determining the corresponding control instruction according to the control function;

s042: transmitting the control instruction in the form of a broadcast communication packet to execute the control function, wherein the control instruction carries an address of the at least one other BLE device.

3. The wireless control method according to claim 2, wherein the at least one other BLE device comprises a first BLE device and a second BLE device, and the control function is a pairing connection function, wherein, the step s041 comprises: acquiring first pairing information of the first BLE device and second pairing information of the second BLE device to form a first pairing information instruction carrying the second pairing information and a second pairing connection instruction carrying the first pairing information;

the step s042 comprises: transmitting the first pairing connection instruction to the first BLE device and the second pairing connection instruction to the second BLE device, to perform a pairing connection between the first BLE device and the second BLE device.

4. The wireless control method according to claim 1, wherein the positioning packets are connection data packets, and the method comprises:

before the step s01, s0: enabling the BLE device in the connected state to transmit a connection data packet according to a Bluetooth standard protocol to the at least one other BLE device establishing a connection to adjust a communication parameter, such that the at least one other BLE device transmits the positioning packets;

wherein the step s04 comprises:

s043: determining the corresponding control instruction according to the control function;

s044: transmitting the connection data packet carrying the control instruction to the at least one other BLE device to execute the control function.

5. The wireless control method according to claim 4, wherein the at least one other BLE device comprises a first BLE device and a second BLE device, and the control function is a pairing connection function, wherein, the step s043 comprises: acquiring first pairing information of the first BLE device and second pairing information of the second BLE device to form a first pairing information instruction carrying the second pairing information and a second pairing connection instruction carrying the first pairing information;

the step s044 comprises: transmitting the first pairing connection instruction to the first BLE device and the second pairing connection instruction to the second BLE device, to perform a pairing connection between the first BLE device and the second BLE device.

6. The wireless control method according to claim 1, wherein the Bluetooth direction positioning technology is an Angle of Arrival (AOA) technology, and the step s02 comprises:

s021: calculating an angle of arrival of the at least one other BLE device transmitting the positioning packets with respect to the BLE device according to the received positioning packets through the AOA technology;

s022: determining a relative position of the at least one other BLE device with respect to the BLE device according to the angle of arrival;

s023: tracking a plurality of relative positions to determine the first relative movement trajectory of the at least one other BLE device with respect to the BLE device.

7. The wireless control method according to claim 6, wherein the step s023 comprises:

s0201: for each relative position, determining the relative position as a valid position point according to a distribution of each trajectory point in the trajectory database;

s0202: determining a first valid position point within a preset time as a starting point of the trajectory, and when a plurality of valid position points starting from the starting point of the trajectory fall into the same first trajectory in the preset trajectory database and the first trajectory is completed within the preset time, determining the first trajectory as the first relative movement trajectory;

s0203: when any valid position point and a previous valid position do not fall into the first trajectory or the first trajectory is not completed within the preset time, performing retiming and performing the step s0202.

8. The wireless control method according to claim 1, wherein the Bluetooth direction positioning technology is an Angle of Departure (AOD) technology, and the step s02 comprises:

s026: calculating an angle of departure of the at least one other BLE device transmitting the positioning packets relative to the BLE device according to the received positioning packets through the AOD technology;

s027: determining a relative position of the at least one other BLE device with respect to the BLE device according to the angle of departure;

s028: tracking a plurality of relative positions to determine the first relative movement trajectory of the at least one other BLE device with respect to the BLE device.

9. The wireless control method according to claim 1, wherein the BLE device is an earphone charging box, and the number of the at least one other BLE device is two, comprising a first true wireless Bluetooth earphone and a second true wireless Bluetooth earphone; the first true wireless Bluetooth earphone and the second true wireless Bluetooth earphone form a Bluetooth earphone pair.

10. A Bluetooth Low Energy (BLE) device communicating with other BLE devices through a Bluetooth link, comprising:

a processor configured to implement the method of claim 1.

11. A chip for a Bluetooth Low Energy (BLE) device having an integrated circuit thereon, wherein the integrated circuit is designed to implement the method of claim 1.

12. A non-transitory storage medium storing a computer program, wherein when the computer program is executed by a processor, the method of claim 1 is performed.

13. A wireless control apparatus, applied to a BLE device, the BLE device as a control terminal communicating with at least one other BLE device through a Bluetooth link, the wireless control apparatus comprises: a processor and a memory for storing program instructions executed by the processor;
wherein the processor is configured to:
receive positioning packets transmitted by at least one other BLE device at a preset time interval;
obtain a first relative movement trajectory of the at least one other BLE device with respect to the BLE device according to the received positioning packets in combination with a Bluetooth direction positioning technology, wherein the first relative movement trajectory is a valid trajectory in a preset trajectory database determined according to a predetermined mapping relationship;
determine a control function corresponding to the first relative movement trajectory according to the predetermined mapping relationship;
transmit a corresponding control instruction to the at least one other BLE device according to the control function to execute the control function;
wherein the BLE device further communicates with a third BLE device through the Bluetooth link, the processor is further configured to be capable of executing the stored program instructions to:
periodically receive the positioning packets transmitted by the third BLE device;
track a second relative movement trajectory of the third BLE device with respect to the BLE device according to the positioning packets transmitted by the third BLE device;
determine whether the first relative movement trajectory is the same as the second relative movement trajectory and both correspond to a preset movement trajectory;
when the first relative movement trajectory is the same as the second relative movement trajectory and both correspond to the preset movement trajectory, transmit a preset control instruction to the at least one other BLE device such that the at least one other BLE device establishes a control relationship with the third BLE device;
transmit control information corresponding to the at least one other BLE device to the third BLE device, such that the at least one other BLE device establishes the control relationship with the third BLE device.

14. The wireless control apparatus according to claim 13, wherein the positioning packets are broadcast communication packets, and the processor is further configured to be capable of executing the stored program instructions to:
control the BLE device in an unconnected state to enter a scanning state;
determine the corresponding control instruction according to the control function;
transmit the control instruction in the form of a broadcast communication packet to execute the control function, wherein the control instruction carries an address of the at least one other BLE device.

15. The wireless control apparatus according to claim 14, wherein the number of the at least one other BLE device is two, and the at least one other BLE device comprises a first BLE device and a second BLE device, the control function is a pairing connection function;
the processor is further configured to be capable of executing the stored program instructions to:
acquire first pairing information of the first BLE device and second pairing information of the second BLE device to form a first pairing information instruction carrying the second pairing information and a second pairing connection instruction carrying the first pairing information;
transmit the first pairing connection instruction to the first BLE device and the second pairing connection instruction to the second BLE device, to perform a pairing connection between the first BLE device and the second BLE device.

16. The wireless control apparatus according to claim 13, wherein the positioning packets are connection data packets, and the processor is further configured to be capable of executing the stored program instructions to:
enable the BLE device in the connected state to transmit a connection data packet according to a Bluetooth standard protocol to the at least one other BLE device establishing a connection to adjust a communication parameter, such that the at least one other BLE device transmits the positioning packets;
determine the corresponding control instruction according to the control function;
transmit the connection data packet carrying the control instruction to the at least one other BLE device to execute the control function;
wherein the BLE device is an earphone charging box, and the number of the at least one other BLE device is two, comprising a first true wireless Bluetooth earphone and a second true wireless Bluetooth earphone; the first true wireless Bluetooth earphone and the second true wireless Bluetooth earphone form a Bluetooth earphone pair.

17. The wireless control apparatus according to claim 16, wherein the number of the at least one other BLE device is two, and the at least one other BLE device comprises a first BLE device and a second BLE device, the control function is a pairing connection function;
the processor is further configured to be capable of executing the stored program instructions to:
acquire first pairing information of the first BLE device and second pairing information of the second BLE device to form a first pairing information instruction carrying the second pairing information and a second pairing connection instruction carrying the first pairing information;
transmit the first pairing connection instruction to the first BLE device and the second pairing connection instruction to the second BLE device, to perform a pairing connection between the first BLE device and the second BLE device.

18. The wireless control apparatus according to claim 13, wherein as for the Bluetooth direction positioning technology AOA technology, the processor is further configured to be capable of executing the stored program instructions to:
calculate an angle of arrival of the at least one other BLE device transmitting the positioning packets with respect to the BLE device according to the received positioning packets through the AOA technology;
determine a relative position of the at least one other BLE device with respect to the BLE device according to the angle of arrival;

track a plurality of relative positions within a preset time to determine the first relative movement trajectory of the at least one other BLE device with respect to the BLE device.

19. The wireless control apparatus according to claim 13, wherein as for the Bluetooth direction positioning technology AOD technology, the processor is further configured to be capable of executing the stored program instructions to:

calculate an angle of departure of the at least one other BLE device transmitting the positioning packets relative to the BLE device according to the received positioning packets through the AOD technology;

determine a relative position of the at least one other BLE device with respect to the BLE device according to the angle of departure;

track a plurality of relative positions within a preset time to determine the first relative movement trajectory of the at least one other BLE device with respect to the BLE device.

20. The wireless control apparatus according to claim 13, wherein the processor is further configured to be capable of executing the stored program instructions to:

for each relative position, determine the relative position as a valid position point according to a distribution of each trajectory point in the trajectory database;

determine a first valid position point within the preset time as a starting point of the trajectory, and when a plurality of valid position points starting from the starting point of the trajectory fall into the same first trajectory in the preset trajectory database and the first trajectory is completed within the preset time, determine the first trajectory as the first relative movement trajectory;

when any valid position point and a previous valid position do not fall into the first trajectory or the first trajectory is not completed within the preset time, perform retiming to determine whether the valid position points within the present time form the first trajectory.

* * * * *